United States Patent [19]

Kuehfuss

[11] Patent Number: 4,633,395
[45] Date of Patent: Dec. 30, 1986

[54] METHOD FOR CHECKING SHEETS OF BILLS DURING THEIR PRODUCTION

[75] Inventor: Runwalt Kuehfuss, Lausanne, Switzerland

[73] Assignee: De La Rue Giori S.A., Switzerland

[21] Appl. No.: 442,655

[22] Filed: Nov. 18, 1982

[30] Foreign Application Priority Data

Dec. 11, 1981 [CH] Switzerland ............... 7916/81

[51] Int. Cl.⁴ .................... G06K 3/00; G06F 15/24
[52] U.S. Cl. ............................. 364/403; 101/72; 101/426; 364/552
[58] Field of Search .......... 364/403, 400, 550, 551; 377/8; 101/72, 73, 426

[56] References Cited

U.S. PATENT DOCUMENTS

| 3,833,795 | 9/1974 | Shoshani et al. | 101/72 |
| 4,141,078 | 2/1979 | Bridges, Jr. et al. | 364/403 |
| 4,336,589 | 6/1982 | Smith et al. | 364/403 |
| 4,455,483 | 6/1984 | Schönhuber | 364/403 |
| 4,463,677 | 8/1984 | Kuehfuss | 101/426 |

Primary Examiner—Felix D. Gruber
Attorney, Agent, or Firm—Darby & Darby

[57] ABSTRACT

Before travelling through the first printing unit (14), the sheets are provided on one edge with an individual, consecutively numbered code, which is stored in a computer. This edge is cut off at a time of subsequent trimming. Before and after each operation in the successive printing stations (1,2,3) in the quality control station (4) and in the numbering station (5), these codes are read by automatic reading units (L1 to L11), fed into the computer and compared in the latter with the stored values. In the case of non-correspondence, the fault is indicated. In this way, each individual sheet can be followed during its various operations and the possible loss of a sheet can be located immediately. The code of a sheet removed from the operating sequence as a sample or as faulty printing is fed by a hand operated reading unit (L3) into the computer and replacement sheets possibly introduced into the operating sequence are previously provided with a special code, which is likewise fed into the computer.

10 Claims, 2 Drawing Figures

METHOD FOR CHECKING SHEETS OF BILLS DURING THEIR PRODUCTION

BACKGROUND OF THE INVENTION

Field of the Invention

The invention relates to a method for checking sheets of bills during their production.

The manufacture of bills, in particular bank notes, takes place in known manner in several separate operations, which may be separated by a period of several days or even several weeks and the individual working stations of which may also have different locations. As a rule the manufacture incorporates the following steps: preparation of a stack with a certain number of sheets of securities, printing of these sheets on both sides in several stages with a given number of bill impressions, so called utilities, various quality controls of random sampling nature and a final visual quality control before numbering of the sheets of bills, then printing of the serial numbers in a numbering machine, cutting up the stack of sheets including trimming into bundles of bills, placing bill bands around the bundles of bills, forming blocks of bundles with consecutively numbered bills of a certain series and packing of these blocks of bundles.

Hitherto, substantially two different systems have been available for checking the manufacture of sheets of bills:

(a) the entire manufacture takes place within a locked and supervised area, in which the sheets of notes or securities themselves are not checked in their various stages of manufacture. Monitoring of the area or of the respective manufacturing and processing areas consists of constant checking of incoming and outgoing workers and visitors, of random intermediate checks and of a material balance between the paper in an unprocessed state supplied for manufacture and the output of finished, processed bills.

(b) Within the framework of the other checking system, all sheets of securities are counted daily in the individual stages of manufacture, locked up overnight in a safe and re-issued the next morning or at the time of further processing. In this way, a daily check of the quantity of sheets of bills and bills circulating in manufacturing or of the number of sheets of bills and bills which are in manufacture, is possible.

In both checking systems, the greatest danger lies in the loss of a sheet of bills in the time interval elapsing between the processing of the sheet and the next counting check. This time interval is generally extraordinarily long in the case of the first checking system. Even in the case of the second checking system, the absence of a sheet of bills can only be reliably detected in the evening of a working day. If the manufacture incorporates intaglio printing using intermediate sheets, then due to technical processes, two or more days may elapse until the respective stack of sheets is once more accessible for a counting check.

If the absence of a sheet of bills is ascertained, then generally one can only discover where a sheet was lost or removed, with a great deal of trouble by retracing the preceding working stages. However, frequently it is no longer possible to ascertain with absolute certainty when and where a sheet disappeared from the sequence of operations. Due to the hitherto conventional counting checks of the sheets of a stack, it is also only possible to monitor the exact number, but it is not possible to ascertain whether somewhere in the sequence of operations, a sheet of bills was replaced by another sheet of paper, either by error or with intent to defraud.

OBJECTS AND SUMMARY OF THE INVENTION

It is the object of the invention to provide a checking system, which not only ascertains the total of the sheets of bills in manufacture, as previously, but on the contrary makes it possible to follow each individual sheet individually from one process to another and from stack to stack and makes it possible to ascertain at any time where a certain sheet is located and possibly where this sheet was removed from the production line.

By means of a code of this type, which is associated with each individual sheet and can be printed in a simple manner on the edge of the latter or can be punched in this edge and by means of automatic code-reading units installed at any points of the working stations, in conjunction with the computer containing the stored code data, it is possible not only to monitor individually all the sheets which are in the process of manufacture and in particular all the sheets belonging to a certain stack, permanently and completely, but in addition, a constant, complete inventory of the paper being processed is possible, which is not only significant from the security point of view, but is also very useful for accounting and for the compilation of statistics.

Since, before the beginning of processing, the first reading unit reads all the codes in a certain order, starting from the sequence supplied to the computer, in all the other stations it is immediately possible to ascertain when a sheet is missing at the time of subsequent reading and when the sequence specified by the first reading unit was broken. If sheets are removed at any point of the sequence of operations, either for checking with random sampling or because the sheet was damaged in a printing machine, or, however, was recognised as faulty printing, manual reading units are provided, which read the code of the sheet removed and supply this to the computer for the purpose of recording it. If replacement sheets are inserted anywhere, then a special code is applied to their edge, which is likewise read by a manual reading unit before the insertion of the sheet in the sequence of operations and the code is transferred to the computer. In this way, intended or necessary removals of sheets or an exchange of sheets is recorded immediately and fault data or an alarm signal appears solely when a sheet has disappeared without being announced by a manual reading unit.

The method according to the invention can be extended due to the fact that with the final visual quality control of the printed sheets, the computer receives not only the code of the sheets recognised as faulty and which have been eliminated, but also the nature of the fault recognised.

Further appropriate developments of the invention as well as the installation for carrying out the method according to the invention will become apparent from the following description.

BRIEF DESCRIPTION OF THE DRAWINGS

One embodiment of the invention is described in detail with reference to the drawings.

DETAILED DESCRIPTION OF THE PREFERRED EMBODIMENTS

Figure 1:
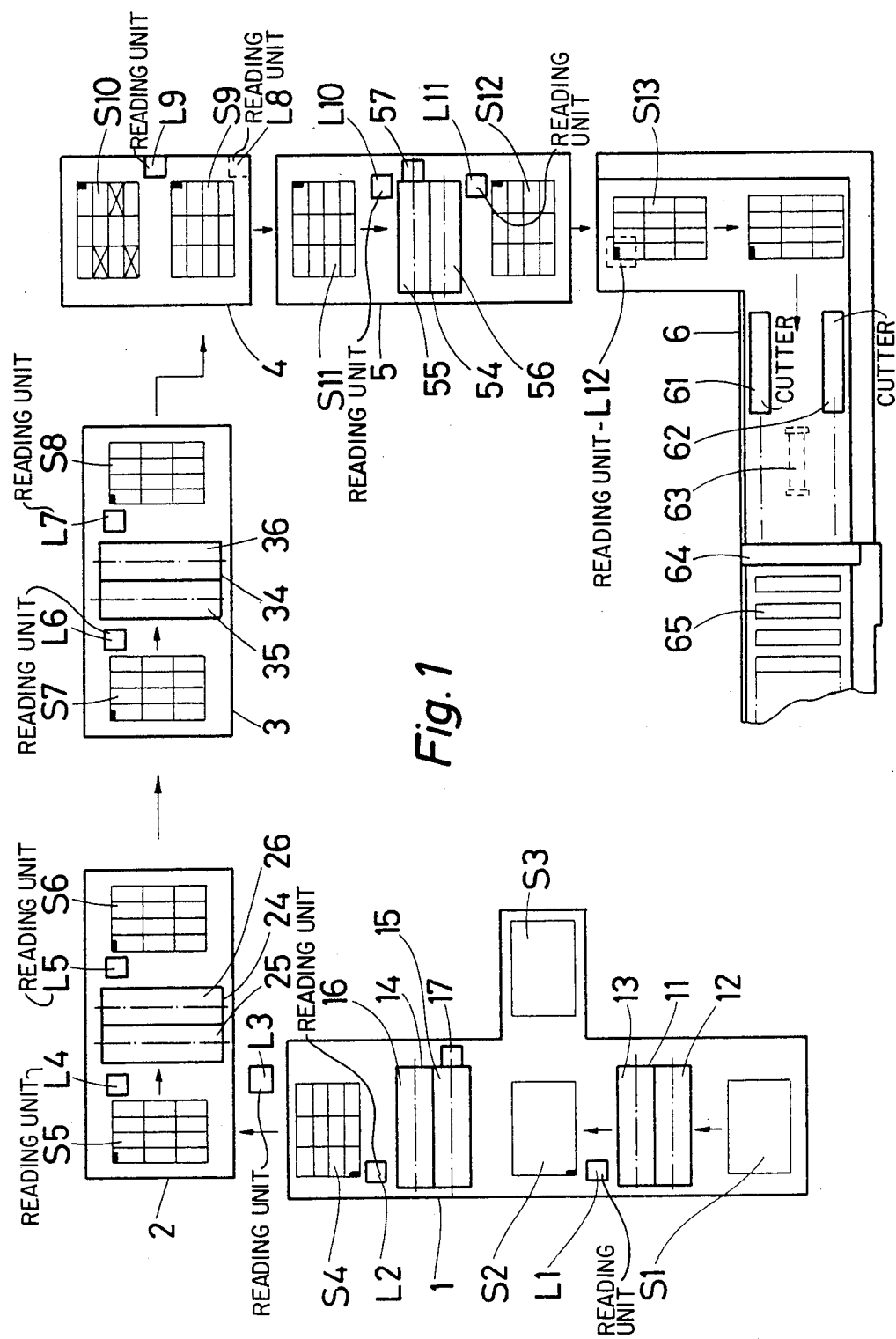
FIG. 1 is a diagrammatic illustration of the individual working stations equipped with code-reading units, through which stations the sheets of notes pass as they are processed

The method according to the invention will be described hereafter as regards the typical case of processing sheets of bank notes incorporating six independent stations. According to FIG. 1, the station 1 comprises an offset printing machine 14 printing the sheets simultaneously on the front and back, i.e. simultaneously on both sides, of which only the two cooperating rubber cylinders 15 and 16 are shown and which prints the security background. The station 2 is a die-stamping printing machine 24 printing on one side, with the printing cylinder 25 and the plate cylinder 26 for printing the main design on one side of the sheet and the station 3 is likewise a die-stamping printing machine 34 printing on one side, with the printing cylinder 35 and the plate cylinder 36 for applying the main design to the other side of the sheet. The visual quality control of the printed sheets and the elimination of faulty sheets takes place at the station 4. The station 5 comprises the numbering machine 54 with the numbering cylinder 55 and the printing cylinder 56 and the station 6 comprises an automatic cutting machine, in which stacks of sheets each containing one hundred sheets are firstly cut by means of the longitudinal cutting tools 61 and 62 simultaneously on their opposite side edges and then divided into bundles of bank notes.

Further processing following trimming of the side edges, which is no longer part of the present invention, includes cutting up the stack of sheets moved forwards by means of the electronic feed 63 stepwise to a strip-cutting unit 64 into layers of strips 65, the cutting up of these layers of strips 65 into bundles of bank notes, placing bill bands around the latter, forming blocks of bundles with consecutively numbered bank notes of a certain series and the placing of bill bands around these blocks of bundles and packing of the latter.

The sheets to be printed and processed arrive in the form of a stack of sheets S1 on the feed table of station 1. For example, the stack of sheets S1 contains five thousand sheets of bank note paper cut to format, in which case the format depends on the number of bank notes printed per sheet, the so called useful number. By means of a sheet feeder, the individual sheets of the stack S1 are first of all supplied to a code-printing machine 11, of which only the printing unit cylinder 13 and the printing cylinder 12 cooperating therewith are shown. This code-printing machine 11 operates like a numbering unit with a code-printing unit moved on by one step for each revolution and prints a consecutively numbered code on one edge of each sheet which is cut off at the time of subsequent trimming of the stack of sheets, which code can be read according to simple methods automatically with suitable reading units at the normal speeds of bank note printing machines. As data for each sheet, each code contains an individual number, by which the sheet can be identified at any time in the course of its processing up until its division and may also comprise further details, such as for example the supplier of the paper and the date of printing of the code, i.e. of the beginning of processing.

Figure 2:
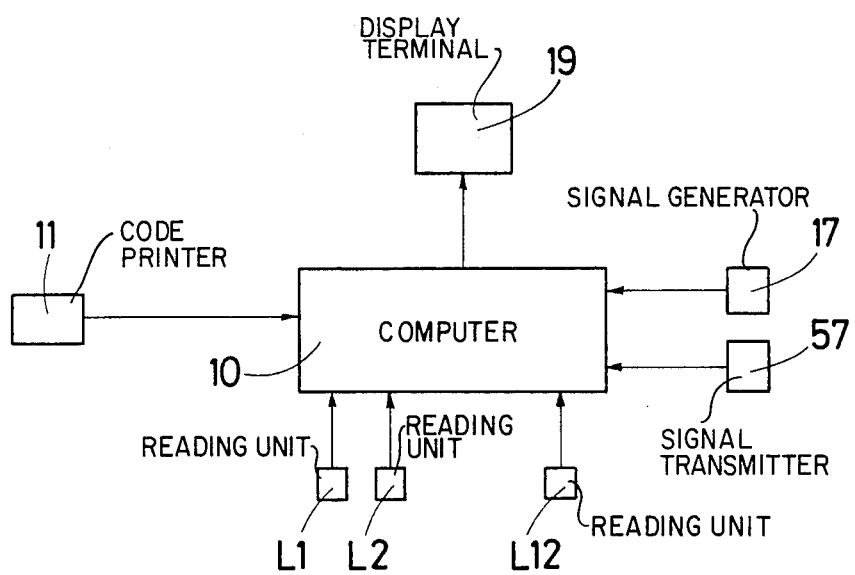
FIG. 2 is a simplified block circuit diagram of the electronic checking system.

In the examle under consideration, the code-printing machine 11 is designed to supply signals by way of the code printed on each sheet to a computer 10, which is shown in the circuit diagram according to FIG. 2 and in which the order of the printed codes is stored.

In any case, the size and arrangement of the code imprint is chosen so that an enlargement of the sheet normally used or of its free edge is not necessary. The number of digits in the individual number contained in the code should be chosen to be so great that all the sheets being manufactured or processed can be covered. If a printing office produces 600 million bank notes per year for example with an average of 27 notes per sheet, then this represents 25 million sheets to be processed. If one assumes that the average time taken to manufacture a sheet amounts to the six months, then approximately 12.5 million sheets must be monitored simultaneously. Thus, a seven figure number is necessary for this, with which up to 99 million sheets can be monitored. With the addition of a place for the details of the manufaturer and two places for the data of the beginning of manufacture, then the code to be used has 10 digits.

Each printed code can be read with certainty by commercially available, simple reading units, which can be arranged at any locations inside the machines or stations, If necessary, the correct reading can be checked in known manner by a check digit added to the code. All reading units, in the example in question the reading units L1 to L7 and L9 to L11 and if necesary the reading units L8 and L12 are connected to the computer 10, which is set up in order to compare the data which has been read and transferred with data stored previously and, according to the results of the comparison, to emit information or trigger alarm signals.

Immediately after printing the code, before depositing the sheet on the stack S2, the codes are read by the reading unit L1, in order to ascertain whether the code, which is shown diagrammatically in FIG. 1 by a small black rectangle, was printed throughout and whether the series of code numbers is correct. All sheets which have no code, are deposited on a reject stack S3, which may take place manually or even automatically by a removal device controlled by the reading unit L1. The sheets of the stack S2 containing a correct code imprint then travel immediately through the offset printing unit 14, where they are printed simultaneously on both sides. Before depositing the sheets on the stack S4, the codes are once more read by the reading unit L2 and fed into the computer 10.

At the same time the computer 10 also receives machine signals emitted by a signal generator 17 of the offset printing unit 14 at the time of each revolution of the cylinder so that information is now stored in the computer 10 indicating on which stack of sheets the respective sheets identified by their code numbers have been deposited. In this case, it is of no consequence that the code number sequence is possibly interrupted by missing numbers, which belong to the sheets without a code imprint deposited on the reject stack S3. In any case, all the sheets belonging to a complete stack S4, printed by the offset printing method are now stored in the computer 10, so that hereafter not only the completeness of the number of sheets of the stack, but also the identity of all the sheets belonging to the stack can be continuously scrutinized and corresponding information can be displayed on a terminal 19 and/or printed out.

With this checking method, it is also possible to record which sheets are located in the stacks deposited for drying, when processing with intermediate sheets, in that a reading unit is associated with each stack.

At this point is should be mentioned that the check according to the invention using code imprints is appropriately supplemented by the conventional check of repeated counting of the sheets of a stack at the various processing stations, so that a double check takes place. By conventional counting, in particular with automatic sheet counters, which are not shown in the drawings, the sum of all the sheets of a stack is respectively ascertained, whereas due to the code imprints according to the invention, not only is the sum of the sheets of a stack likewise monitored, but in addition, each sheet of a stack can also be identified individually. When a stack of sheets is counted in the normal manner, then this result of the counting and the respective computer information about this stack must correspond. A combined check of this type can be carried out without difficulty automatically due to the fact that the sheet counters are designed to emit signals about the result of the count and are likewise connected to the computer 10.

If, for example after offset printing, a sample sheet is removed from the stack S4, then a separate manually operated reading unit L3 is provided for such a case. The code of the sheet removed is read by this manual reading unit L3 and, together with a characterising digit of the respective reading unit, is fed into the computer 10, which in this way records that a sheet with a certain code number was removed at this point and therefore the sequence of numbers of the stack is broken. Information is thus stored relating to where and who removed which sheet. If the sheet is returned to the production line at another point, then this insertion is likewise transferred to the computer 10 by means of a manual reading unit reading the respective code. Even when a sheet is removed from the production line on account of damage in the machine or on account of a recognised fault, its code is fed into the computer 10 by a manual reading unit, in which case additional code numbers relating to the cause of the removal of the sheet and the person responsible can be fed in for the purpose of storage. In order to keep the number of for example five thousand sheets of a stack constant, a replacement sheet can be introduced if necessary as an alternative, for which a special code imprint with a code number has been prepared. This code is once more read by a manual reading unit and fed into the computer, which monitors the constancy of the total number of sheets in a stack.

Thus, a complete inventory of all the sheets located in the process of manufacture and their whereabouts can be made continuously available. In the course of processing, the sequence of code numbers can be lost by the removal of individual sheets or also by mixing stacks, but in the computer 10, the order of the sheets and possible changes to the code number sequences remains stored, so that upon each new reading of the code imprints, the absence of a sheet is immediately ascertained and the corresponding alarm signal, possibly with simultaneous stopping of the respective machine, can be emitted. Furthermore, the missing code number is printed out.

After the above general explanations about the possibilities and advantages of a check by means of code imprints, the continuation of processing will now be described with reference to the diagram according to FIG. 1. Generally, the stack S4 which thus contains sheets printed on both sides by the offset printing method, is not printed immediately thereafter by die-stamping, but on the contrary is bound and stored in a safe until the continuation of processing, which may last for several days or even weeks.

At the beginning of the following operation in station 2, the sheets of the inlet stack S5 which must thus normally be identical to the outlet stack S4 at the outlet of station 1, are read by a reading unit L4 before entering the die-stamping printing unit 24. If, in this case, the absence of a sheet or, however, a sheet not belonging to this stack is discovered, then it is certain that the disappearance or the unauthorized exchange of a sheet must have taken place within the time since the last reading with the reading unit L2. On leaving the die-stamping printing unit 24, in which the sheets are printed on one side with the main design, further reading of the code imprints takes place with the reading unit L5 and thus a repeated check of the completeness takes place, before the sheets are deposited on the outlet stack S6.

Subsequently, possibly after a further interruption of several days and storage of the stack in a safe, the die-stamping printing takes place in station 3 on the other side of the sheet. As in station 2, the sheet removed from the inlet stack S7 are read by a reading unit L6 before entering the die-stamping printing unit 34 and after leaving the die-stamping printing unit 34 are once more checked by a reading unit L7, before they enter the outlet stack S8.

The visual quality control as regards faulty printing takes place in the following station 4, once again generally only after a certain waiting period, In this case, before the beginning of this visual check, automatic reading of the code imprints on all the sheets of the stack S9 to be checked can take place with a reading unit L8, as shown in dot dash line in FIG. 1, in order that the operator carrying out the manual quality control is certain that he has received a complete stack of sheets. The faulty printing recognised by him is marked in known manner, then fed into a mannual reading unit L9 for the purpose of reading the respective code imprints and finally deposited on a stack S10 of sheets comprising faulty printing. In this way, all sheets comprising faulty printing, which were located in the stack S9, are recorded in the computer 10. At the same time, by means of a corresponding signal transmitter at the reading unit L9, information about the type of fault can be transferred to the computer.

The stack S9 which has been checked visually and is free from the faulty printing, is preferably completed by further perfect replacement sheets with a code imprint which has been read previously, in order to make up the given total number amounting for example to 5000 sheets, which is stored in the computer 10, For the perfect sheets of the stack S9, it is recommended to feed a new code number sequence into the computer 10. The stack S9 can then be packed without further counting once more from the security point of view and stored until the next operation, namely printing of the numbers. Before the numbering operation in station 5, the sheets removed from the inlet stack S11 are read for the purpose of checking by a reading unit L10, as in all preceding stages of manufacture. In this case, when one starts from a certain setting of the numbering unit on the numbering cylinder 55, then the serial numbers, which are printed, are known by way of the switching motion of these numbering units. This information maybe transferred in manner known per se to the computer 10 likewise by a signal transmitter 57 provided on the numbering unit 54, due to which, in conjunction with the code imprints read, it is possible to record which serial number was printed on which sheet.

Before the numbered sheets reach the outlet stack S12, their code imprints are once more read by a reading unit L11. Thus, generally, the respective stored values in the computer 10 can be cancelled, so that in so doing, checking by means of the code imprints is terminated. In the absence of faults, the sheets leaving the numbering station 5 are numbered with consecutive serial numbers, so that in future conventional counting of the stack of sheets as regards completeness is sufficient for the purpose of checking, also, no security risk is then caused, if in known manner the numbering station 5 and the cutting station 6 with their subsequent processing stations are combined to form a complete machine operating automatically, in which stacks of sheets each comprising 100 sheets are produced at the outlet of the numbering station 5, in which the superimposed bank note imprints are each numbered consecutively and these stacks of sheets are conveyed and processed further in succession without manual intervention, until finally the finished packed blocks of bank note bundles are discharged.

The stack S13 at the inlet of the cutting station 6 is moved forwards in the direction of the arrows and subjected to trimming in the two longitudinal cutting units 61 and 62, in which case the edge region comprising the code imprint is also cut off. Then, as aforementioned, the stack is fed stepwise to the strip-cutting unit 64 in order to be cut into layers of strips 65, which are then processed further in manner known per se.

If the numbering station 5 and cutting station 6 are separate machines, then if desired, a further reading unit L12 for the code imprints can be provided at the inlet of the cutting station 6, as shown in dot dash line in FIG. 1, in which case, the corresponding data stored in the computer 10 are naturally cancelled solely after reading by the reading unit L12.

The preceding description shows that the checking method according to the invention allows not only complete monitoring of the fate of all individual sheets involved, but also supplies all the desired information for a permanent inventory and the compilation of various types of statistics. Thus, not only are all security conditions fulfilled in an optimum manner, but also all values for the complete technical monitoring of the entire production and accounting are obtained. Furthermore, the checking method according to the invention is very flexible and can be modified easily depending on the desired conditions and the respective printing machines used. Since the reading units have small dimensions and preferably read photo-electrically without contact, they can be installed at virtually any point of a machine and also incorporated subsequently without difficulty.

Instead of being applied as in the example described according to FIG. 1, the code imprints on the sheets may also be applied already in the paper factory or in another separate operation. The code-printing unit may also be fitted in the immediate vicinity of the printing cylinder of the first printing unit in station 1 so that the sheet is printed with the code directly on entering the printing cylinder or the printing gap. In this case, intermediate stacking of the sheets printed with the code before entering the first printing unit is dispensed with. Likewise, the reading unit L1 according to FIG. 1 may be dispensed with, so that solely on the basis of reading by the reading unit L2 after the first printing unit is it ascertained whether all sheets are correctly provided with a code.

Also, the input of code information into the computer 10 may take place in another manner than by the code-printing unit printing the code, namely by means of a special data carrier, for example in the form of a magnetic tape, on which the codes of all sheets of a stack to be processed have been stored previously. This is favourable if the code imprint on the sheet is produced in a separate operation preceding processing, in particular already in the paper factory. This data carrier is then allocated to the respective stack of sheets, so to speak as an accompanying document. Before the beginning of processing, the stored data of this data carrier is then fed into the computer 10.

If known, combined offset and die-stamping machines, which each print solely on one side, are used as printing stations, then the sheets naturally pass through only two separate printing stations. Wherever the conveyance of the stack of sheets can take place automatically without manual intervention between two processing stations, the number of reading units necessary for securing monitoring can naturally be reduced as required.

The invention may thus have numerous variations as regards the number and position of reading units, as regards the location and the instant when the codes are printed on the edge of the sheet, also as regards the manner of feeding the code information into the central computer.

What is claimed is:

1. A method for checking sheets of bills during their manufacture, the manufacture of the sheets of bills including at least first and second successive operations, the method comprising the steps of:
    applying a consecutively numbered code to at least one edge of each sheet prior to the completion of the first operation, the code being applied to the at least one edge of each sheet to allow the code to be removed by trimming from the sheet the at least one edge of the sheet containing the code;
    storing the consecutively numbered code;
    reading from each sheet the code contained thereon prior to the completion of the second operation; and
    comparing the stored codes with the read codes to determine if the read codes correspond to the stored codes.

2. A method for checking sheets of bills during their manufacture, the manufacture of the sheets of bills including a series of successive bill manufacturing operations, the bill manufacturing operations including a bill printing operation, a serial numbering operation, and a sheet cutting operation in which at least one edge of each sheet is removed, the sheets being arranged in stacks prior to each bill manufacturing operation, the method comprising the steps of:
    applying a consecutively numbered code to the at least one edge of each sheet prior to the completion of one operation of the series of bill manufacturing operations;
    reading the codes applied to the sheets;
    storing the read codes;
    re-reading the codes applied to the sheets prior to the completion of the next successive operation after said one operation of the series of bill manufacturing operations; and comparing the re-read codes with the stored codes to determine if the re-read codes correspond to the stored codes.

3. A method as defined by claim 2, wherein the code is applied to the sheets by printing the code thereon.

4. A method as defined by claim 2, wherein the code is applied to the sheets by punching the code therein.

5. A method as defined by claim 3, wherein the code is printed on the sheets before the bill printing operation.

6. A method as defined by claim 3, wherein the code is printed on the sheets during the bill printing operation.

7. A method as defined by claim 2, which comprises the further step of removing sheets having no codes applied thereto and removing sheets having illegible codes applied thereto, after the step of applying the codes to the sheets.

8. A method as defined by claim 2, which comprises the further steps of:
adding replacement sheets to the stacks of sheets;
applying a special code to the replacement sheets; and
storing the special code.

9. A method as defined by claim 2, which comprises the further steps of:
counting the number of sheets being printed in the bill printing operation;
storing the counted number; and
comparing the counted number with the stored code to determine in which stack a respective sheet having a code applied thereto is located.

10. A method for checking sheets of bills during their manufacture, the manufacture of the sheets of bills including a series of successive bill manufacturing operations, the bill manufacturing operations including a bill printing operation, a serial numbering operation, and a sheet cutting operation in which at least one edge of each sheet is removed, the sheets being arranged in stacks prior to each bill manufacturing operation, the method comprising the steps of;
printing the sheets with bill prints in the bill printing operation;
applying a consecutively numbered code to at least one edge of each sheet prior to the completion of the printing operation;
storing the codes;
inspecting the sheets to control the quality of the bill prints;
applying a serial number to each bill print of each sheet in the serial numbering operation;
cutting the sheets into bills and trimming the at least one edge of each sheet having the consecutively numbered code to remove the code from each sheet;
reading the code applied to each sheet at least once after the completion of each operation and prior to the beginning of the next successive operation;
storing the read codes; and
comparing the read codes with the previously stored codes to determine if the read codes correspond with the previously stored codes.

* * * * *